United States Patent [19]

Maruhashi et al.

[11] Patent Number: 4,714,580
[45] Date of Patent: Dec. 22, 1987

[54] PLASTIC VESSEL HAVING ORIENTED COATING AND PROCESS FOR PREPARATION THEREOF

[75] Inventors: Yoshitsugu Maruhashi, Yokohama; Isao Tanikawa, Ayase; Sadao Hirata, Kamakura, all of Japan

[73] Assignee: Toyo Seikan Kaisha, Ltd., Tokyo, Japan

[21] Appl. No.: 496,996

[22] Filed: May 23, 1983

[30] Foreign Application Priority Data

May 28, 1982 [JP] Japan ................... 57-89963

[51] Int. Cl.$^4$ ............................................. B29C 45/14
[52] U.S. Cl. ..................................... 264/516; 264/512; 264/513; 264/515; 264/521
[58] Field of Search ............... 264/516, 512, 513, 515; 428/35, 480, 483, 520, 521, 332, 334, 335, 336, 542.8

[56] References Cited

U.S. PATENT DOCUMENTS

| 3,449,479 | 6/1969 | Cines | 264/513 |
| 3,804,663 | 4/1974 | Clark | 117/101 |
| 4,127,633 | 11/1978 | Addleman | 427/307 |
| 4,254,170 | 3/1981 | Roullet et al. | 428/35 |
| 4,393,106 | 7/1983 | Maruhashi et al. | 428/35 |
| 4,451,426 | 5/1984 | Branchadell | 428/35 |
| 4,478,889 | 10/1984 | Maruhashi et al. | 427/230 |
| 4,486,378 | 12/1984 | Hirata et al. | 264/312 |

Primary Examiner—John E. Kittle
Assistant Examiner—P. R. Schwartz
Attorney, Agent, or Firm—Sherman and Shalloway

[57] ABSTRACT

Disclosed is a coated oriented plastic vessel formed by subjecting a parison, preform or sheet comprising a molecularly orientable thermoplastic resin substrate and a coating layer of a vinylidene chloride copolymer formed on at least one surface of said substrate to a draw-molding operation such as biaxial draw-blow-molding or draw-forming, wherein the coating layer of the vinylidene chloride copolymer has such a molecular orientation tht the sum of two-dimensional orientation coefficients (l+m) in the axial direction and circumferential direction is at least 0.03 as measured according to the polarized light fluorometry and the coating layer is not substantially peeled at the low-temperature burst test conducted at −5° C. This coated oriented plastic vessel is prepared by a process comprising coating an aqueous latex of a vinylidene chloride copolymer on at least one surface of a parison, preform or sheet composed of a molecularly orientable thermoplastic resin, drying the coated latex to form a coated structure and subjecting the coated structure to a draw-molding operation such as biaxial draw-blow-molding or draw-forming at a temperature higher than the glass transition temperature of the vinylidene chloride copolymer but lower than the melting point of the vinylidene chloride copolymer, at which temperature draw-molding of said thermoplastic resin is possible, to thereby from the coated structure into a shape of a vessel while drawing the coating layer.

4 Claims, 1 Drawing Figure

PLASTIC VESSEL HAVING ORIENTED COATING AND PROCESS FOR PREPARATION THEREOF

BACKGROUND OF THE INVENTION (1) Field of the Invention

The present invention relates to a plastic vessel having an oriented coating and a process for the preparation thereof. More particularly, the present invention relates to a coated oriented plastic vessel, in which such properties as the adhesion of a vinylidene chloride copolymer coating to a substrate, the whitening resistance and the gas barrier property are highly improved, and a process for the preparation thereof.

(2) Description of the Prior Art

Plastic bottles formed by melt-extruding a thermoplastic material such as a polyolefin and hollow-molding (blow-molding) the melt are used in various fields instead of glass bottles because they are lighter in the weight than glass bottles and are excellent in the impact resistance.

General-purpose plastics such as polyolefins are excellent in the moisture resistance and sanitary characteristics, but they have a relatively large oxygen permeation coefficient and permeation of oxygen through the vessel wall cannot be neglected. Therefore, these plastic materials are not suitable for the production of vessels to be used for preserving foods for a long time or cosmetic vessels for which a high perfume-retaining property is required.

As vessels in which this defect is eliminated, there have already been developed plastic bottles comprising a resin excellent in the oxygen barrier property as a vessel wall-constituting component. Among melt-extrudable thermoplastic resins available at the present, a saponified ethylene-vinyl acetate copolymer (ethylene-vinyl alcohol copolymer) is most excellent in the oxygen barrier property. However, this saponified copolymer is poor in the moisture resistance, that is, the water vapor barrier property, and in this saponified copolymer, the oxygen permeation coefficient tends to prominently increase with increase of the humidity. Therefore, when this saponified copolymer is practically used for the production of plastic bottles, the saponified copolymer is sandwiched with a moisture-resistant resin such as a polyolefin and the resulting laminate is used, which is very troublesome.

Plastic bottles formed by biaxially draw-blow-molding a parison of a polyester composed mainly of ethylene terephthalate units are now used as packaging vessels for beverage or beer. Plastic bottles of this type are light in the weight and excellent in the impact resistance, but they are defective in that the life is considerably shorter than the life of glass bottles.

It is known that a vinylidene chloride copolymer is excellent in the barrier property to various components. For example, the specification of U.S. Pat. No. 3,922,451 teaches that when a latex of a vinylidene chloride copolymer is applied to the inner surface of a metal vessel or plastic vessel and the latex is dried under certain conditions, a protective coating excellent in the continuity and adhesion to the substrate can be formed.

However, as the result of research made by us, it was found that the adhesion of a coating of a vinylidene chloride copolymer applied in the form of a latex to plastic substrates is still insufficient and involves a problem. More specifically, when a content is stored for a long time or the vessel is attacked by heat, pressure or a chemical, such a trouble as peeling of the vinylidene chloride copolymer coating from the plastic substrate or whitening of the coating per se is readily caused and the intended improvement of the gas barrier property cannot be attained.

SUMMARY OF THE INVENTION

We found that if a coating of a vinylidene chloride copolymer formed on a plastic substrate is molecularly oriented, the adhesion of the coating to the plastic substrate is prominently improved and the whitening resistance and gas barrier property are further enhanced.

It is therefore a primary object of the present invention to provide a coated plastic vessel in which the adhesion of a coating layer of a vinylidene chloride copolymer to a plastic substrate and the whitening resistance and gas barrier property are highly improved.

Another object of the present invention is to provide a process for preparing a coated plastic vessel excellent in the above-mentioned properties by simple operations of coating a latex of a vinylidene chloride copolymer on a parison, preform or sheet to be formed into a vessel and subjecting the coated parison, preform or sheet to customary biaxial draw-blow-molding, draw-forming and the like.

In accordance with one aspect of the present invention, there is provided a coated oriented plastic vessel formed by subjecting a parison, preform or sheet comprising a molecularly orientable thermoplastic resin substrate and a coating layer of a vinylidene chloride copolymer formed on at least one surface of said substrate to a draw-molding operation such as biaxial draw-blow-molding or draw-forming, wherein the coating layer of the vinylidene chloride copolymer has such a molecular orientation that the sum of two-dimensional orientation coefficients (l+m) in the axial direction and circumferential direction is at least 0.03 as measured according to the polarized light fluorometry and the coating layer is not substantially peeled at the low-temperature burst test conducted at $-5°$ C.

In accordance with another aspect of the present invention, there is provided a process for the preparation of coated oriented plastic vessels, which comprises coating an aqueous latex of a vinylidene chloride copolymer on at least one surface of a parison, preform or sheet composed of a molecularly orientable thermoplastic resin, drying the coated latex to form a coated structure and subjecting the coated structure to a draw-molding operation such as biaxial draw-blow-molding or draw-forming at a temperature higher than the glass transition temperature of the vinylidene chloride copolymer but lower than the melting point of the vinylidene chloride copolymer, at which temperature draw-molding of said thermoplastic resin is possible, to thereby form the coated structure into a shape of a vessel while drawing the coating layer.

DETAILED DESCRIPTION OF THE PREFERRED EMBODIMENTS

Figure 1:
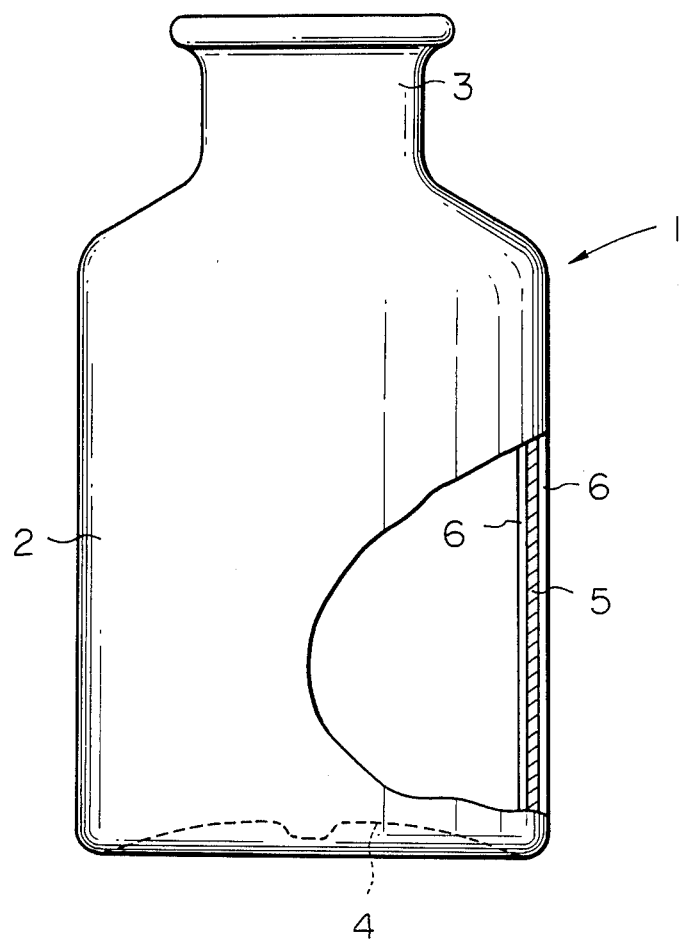
FIG. 1 is a partially sectional view showing one embodiment of the coated plastic vessel according to the present invention.

Referring to FIG. 1 showing one embodiment of the coated plastic bottle of the present invention, this bottle 1 comprises a circumferential wall portion 2 having a circular or ellipsoidal section, a mouth portion 3 coniguous integrally to the circumferential wall portion 2 and a bottom portion 4 contiguous to the lower end of the circumferential wall portion 4. The entire wall of the bottle comprises a substrate 5 of a melt-moldable plastic material and a coating layer 6 of a vinylidene chloride copolymer formed on the surface of the substrate 5. The substrate and coating layer are formed into a shape of a bottle by biaxial draw-blow-molding or draw-forming. This coating layer 6 may be formed on both the surfaces of the substrate 5 as shown in FIG. 1, or it may be formed only on the inner surface or outer surface of the substrate 5.

As pointed out hereinbefore, one of important features of the present invention resides in the finding that when the coating layer 6 of a vinylidene chloride copolymer is molecularly oriented so that the in-plane orientation coefficient (l+m) is at least 0.3, especially at least 0.05, the adhesion of the coating layer 6 to the plastic substrate 5 is prominently improved even under very severe conditions.

It is known that a vinylidene chloride copolymer is excellent in the barrier property to various gases such as oxygen, carbon dioxide gas and water vapor. However, hot molding of this copolymer is very difficult and when the copolymer is used for formation of a coating, the copolymer should be handled in the form of an aqueous latex.

In order to shape a resin applied in the form of latex particles into a dense and continuous coating film, it is ordinarily necessary to heat the applied latex resin particles at a temperature higher than the film-forming temperature inherent to the latex resin particles. It is considered that from this viewpoint, the specification of the above-mentioned U.S. patent specifies that the latex coating should be dried at a temperature higher than 110° C.

Indeed, the coating formed under this drying condition is seemingly continuous and adheres closely to the plastic substrate. However, when the coating is dipped in an alkaline aqueous solution or benzene, or when the content in the vessel is frozen and the vessel is swollen, the coating of the vinylidene chloride copolymer is likely to peel off from the plastic substrate. Furthermore, the coating of the vinylidene chloride copolymer tends to peel very easily on contact with various chemicals or hot water. It is considered that in a coating film formed by heating latex particles of a vinylidene chloride copolymer, the particles are aggregated with one another to some extent to form a dense structure but an interface called "stone wall structure" is still left among the particles and troubles such as the above-mentioned peeling and whitening are caused because of the presence of this interface.

In the present invention, by molecularly orienting the coating of the vinylidene chloride copolymer at a high ratio, foreign substances present in the interface among particles, such as an emulsifier and a dispersant, are pushed out, with the result that the denseness and adhesion of the coating are prominently improved.

The sum of two-dimensional orientation coefficients or the in-plane orientation coefficient (l+m) referred to in the instant specification and appended claims is a value determined according to the polarized light fluorometry, as described, for example, by Mr. Yasunori Nishijima in Polymer, Vol. 15, No. 175, page 868 (1966) published by the Japanese Association of Polymers, and is quantitatively given by the following formula:

$$I_{\parallel}(\omega) = K\phi(l\cos^4\omega + m\cos^4\omega + \tfrac{8}{3}n)$$

wherein $I_{\parallel}(\omega)$ stands for the intensity of the polarized light component of the fluorescence emitted from a thermoplastic resin as the sample, the mark $\parallel$ indicates that the vibration direction of the incident polarized light is in parallel to the direction of the measured polarized light, $\omega$ stands for the rotation angle of the sample to the vibration direction of the above-mentioned polarized light, K stands for the maximum excitation probability attainable when the molecular axis of the sample is in parallel to the vibration direction of the excited fluorescence, $\phi$ stands for the molecular fluorescent shrinkage, and l stands for the ratio of orientation of the molecules in one optional direction (axial direction) in the plane of the wall of the final formed vessel, m stands for the ratio of orientation of the molecule in the direction (circumferential direction) rectangular to the direction l, n stands for the ratio of non-orientation in the plane and the relation of l+m+n=1 is established.

When the in-plane orientation coefficient (l+m) of the coating layer of the vinylidene chloride copolymer in the final vessel is smaller than 0.03, the intended improvements of the adhesion of the coating layer to the plastic substrate of the vessel, the whitening resistance and the gas barrier property cannot be attained. According to the present invention, by giving the above-mentioned orientation also to the coating layer, even if the vessel is subjected to the low-temperature burst test at −5° C., peeling of the coating layer from the plastic substrate can be prevented. Furthermore, as shown in Examples given hereinafter, even if the vessel is dipped in an alkaline aqueous solution or an organic solvent such as benzene for a long time, the adhesion of the coating layer to the substrate is hardly degraded.

Since the coating layer of the vessel of the present invention is densified by the above-mentioned molecular orientation, whitening is hardly caused even on contact with various chemicals or hot water, and the carbon dioxide gas permeation coefficient is reduced to about ½ of the carbon dioxide gas permeation coefficient of the unoriented coating layer when the comparison is made based on the same thickness. Thus, the gas barrier property is prominently improved according to the present invention.

The parison, preform or sheet that is used in the present invention is obtained from a molecularly orientable, hot-moldable thermoplastic resin by any optional known hot-molding means. For example, a parison for biaxial draw-blow-molding can be obtained by extruding the above-mentioned resin in the form of a pipe and cutting the pipe. Furthermore, a bottomed parison can be obtained by extruding the above-mentioned resin in the form of a cylinder, pinching off the cylinder by a split mold and performing preliminary blow-molding. Moreover, a bottomed parison for biaxial draw-blow-molding can be obtained by injection molding of the above-mentioned resin. Still further, a sheet for molding a wide-mouthed bottle or cup-shaped vessel by draw-forming can be obtained by extruding the above-mentioned resin in the form of a sheet through a T-die or the like.

As preferred examples of the resin to be used for formation of a parison or the like, there can be mentioned olefin resins such as isotactic polypropylene, crystalline propylene-ethylene copolymers, crystalline propylene-butene-1 copolymers, crystalline propylenebutene-1-ethylene copolymers and ethylene-vinyl alcohol copolymers, polyesters such as polyethylene terephthalate, polybutylene terephthalate and polyethylene terephthalate/isophthalate, polyamides such as nylon 6, nylon 6,6 and nylon 6,10 polystyrene and styrene copolymers such as styrene-butadiene copolymers, styrene-acrylonitrile copolymers and styrene-butadiene-acrylonitrile copolymers (ABS resins), polyvinyl chloride and vinyl chloride copolymers such as vinyl chloride-vinyl acetate copolymers, acrylic polymers such as polymethyl methacrylate and methyl methacrylate-ethyl acrylate copolymers, and polycarbonates, though resins that can be used are not limited to those exemplified above. These thermoplastic resins may be used singly or in the form of blends of two or more of them. The plastic parison or the like may have a single-layer structure, or it may have a laminate structure including at least two layer, which is prepared, for example, by co-melt-extrusion.

At least one surface of the plastic parison or the like is coated with an aqueous latex of a vinylidene chloride copolymer. A copolymer comprising vinylidene chloride as main structural units and at least one comonomer selected from acrylic and methacrylic monomers, vinyl aromatic monomers such as styrene and vinyltoluene, vinyl esters such as vinyl acetate and vinyl propionate, diolefins such as butadiene and isoprene, and methyl vinyl ether, glycidyl allyl ether, vinyl chloride, trichloroethylene, tetrachloroethylene, vinyl fluoride, vinylidene fluoride, trifluoroethylene, tetrafluoroethylene, maleic anhydride, fumaric acid, vinylsuccinic acid imide and vinyl pyrrolidone, is used. As preferred examples of the acrylic and methacrylic monomers, there can be mentioned acrylic acid, acrylonitrile, acrylamide, methyl acrylate, ethyl acrylate, methyl α-chloroacrylate, propyl acrylate, butyl acrylate, hexyl acrylate, octyl acrylate, cyclohexyl acrylate, glycidyl acrylate, 2-hydroxyethyl acrylate, acrylic monoglyceride, phenyl acrylate, methacrylic acid, methacrylonitrile, methacrylamide, methyl methacrylate, amyl methacrylate, glycidyl methacrylate, methacrylic monoglyceride, 2-hydroxypropyl methacrylate, β-methoxyethyl methacrylate, β-aminoethyl methacrylate and γ-N,N-diethylaminopropyl methacrylate.

An aqueous copolymer latex having a solid concentration of 20 to 65% and a viscosity of 3 to 500 cps is preferably used.

A known coating method such as dip coating, spray coating, brush coating, roller coating, flow coating, electrostatic coating, centrifugal coating, flow cast coating, electrophoretic coating or a combination thereof may be adopted for coating the above-mentioned latex on the substrate such as a plastic parison. The coating may be conducted only once, or a multi-stage coating method in which the coating is carried out at least two times may be adopted. If necessary, in order to improve the wettability characteristic of the substrate such as a plastic parison, a preliminary treatment such as treatment with an anchoring agent, a corona discharge treatment, a surface active agent-coating treatment or a chemical etching treatment may be performed before the coating operation. Furthermore, a conductive treatment may be carried out so as to render the substrate electrically conductive.

It is preferred that a coating layer of the above-mentioned copolymer be formed on both the surfaces of the plastic substrate. In order to prevent intrusion of gases contained in air, it is sufficient if the coating layer is formed on the surface to be formed into the outer surface of the final vessel, and in order to prevent escape of a gas or perfume from the content, it is sufficient if the coating layer is formed on the surface to be formed into the inner surface of the final vessel.

The copolymer that is used in the present invention is excellent in the combination of the oxygen barrier property and the water vapor permeability, and the humidity dependency of the oxygen barrier property is very small. Accordingly, if only a very thin layer of the copolymer is formed on the plastic bottle substrate, there can be obtained an excellent barrier property to various gases, and satisfactory results can be obtained if the thickness of the copolymer layer formed on the final vessel is 0.1 to 40μ, especially 0.5 to 30μ.

The coated copolymer is dried at a temperature of 20° to 150° C., especially 40° to 108° C., for 2 seconds to 100 hours, though the drying conditions differ to some extent according to the thickness of the coating.

In the present invention, even if the temperature of the coating layer of the vinylidene chloride copolymer is not elevated to a high level, the denseness and adhesion of the coating layer can be enhanced by the molecular orientation, and therefore, deterioration due to thermal decomposition or thermal degradation, as caused when a resin layer is heated at a high temperature, can be reduced. This is another advantage attained in the present invention.

According to the present invention, the resulting coated structure is subjected to draw-molding such as biaxial draw-blow-molding or draw-forming at a temperature higher than the glass transition temperature of the vinylidene chloride copolymer but lower than the melting point of the vinylidene chloride copolymer, at which temperature draw-molding of the above-mentioned thermoplastic resin is possible, whereby the coated structure is formed into a shape of a vessel while drawing the coating layer.

The glass transition temperature (Tg) and melting point (Tm) of the vinylidene chloride copolymer differ according to the kind and amount of the comonomer. However, the molding temperature is ordinarily in the range of from −25° to 190° C., especially from −20° to 180° C. If the molding temperature is too low and below the above range, the drawing operation becomes difficult because of breakage of the coating, and if the molding temperature is too high and exceeds the above range, it is impossible to set the molecular orientation caused by drawing in the coating layer. Furthermore, in order to draw the coating layer, the thermoplastic resin as the substrate should also be drawn. From this viewpoint, it is important that the molding temperature should be within the range of temperatures at which draw-molding of the thermoplastic resin as the substrate is possible.

Since the coating of the vinylidene chloride copolymer used in the present invention can be molecularly oriented at a relatively low temperature by drawing, as pointed out hereinbefore, it is possible to perform draw-molding in such a state that a temperature difference resides between the outer surface of the coating layer and the resin substrate. For example, if draw-molding is carried out under such conditions that the temperature (To) of the outer surface of the coating layer is lower by at least 5° C. than the average temperature (Ts) of the resin substrate, an effective molecular orientation can be imparted to the coating layer while preventing deterioration thereof.

In order to maintain the parison, preform or sheet at the above temperature, a preliminary heat treatment and, if necessary, a cooling treatment may be performed.

Draw-molding of the parison, preform or sheet coated with the vinylidene chloride copolymer may be carried out under known conditions if the above requirements are satisfied. Namely, biaxial draw-blow molding or draw-forming such as air-pressure forming or plug-assist forming is carried out under temperature conditions causing the molecular orientation by drawing of the plastic substrate and coating layer.

In case of biaxial draw-blow-molding, a parison or preform is mechanically drawn in the axial direction in a split mold, and simultaneously, a fluid is blown into the parison or preform to expand and draw the parison or preform in the circumferential direction. Drawing in the axial direction is accomplished by pushing a drawing rod in case of a bottomed parison or preform. In case of a tubular preform, drawing in the axial direction is accomplished by holding both the end portions of the tube by a clamp mechanism or passing the tube through between two rolls differing in the rotation speed. It is preferred that the drawing operation be carried out so that the draw ratio in the axial direction is 1.10 to 20, especially 1.20 to 15, and the draw ratio in the circumferential direction is 1.20 to 50, especially 1.25 to 30.

In draw-forming of the coated structure into a wide-mouthed bottle or cup, air-pressure forming or plug-assist forming is carried out under temperature conditions causing the molecular orientation in the sheet so that the draw ratio defined by the following formula:

$$\text{Draw ratio} = \frac{\text{thickness of sheet}}{\text{thickness of barrel portion}}$$

is 1.10 to 100, especially 1.20 to 50.

The present invention will now be described in detail with reference to the following Examples that by no means limit the scope of the invention.

Incidentally, in these Examples, the solvent resistance, chemical resistance (alkali resistance), hot water resistance, low-temperature ($-5°$ C.) burst characteristic, oxygen permeability, carbon dioxide gas permeability, water vapor permeability, oxygen permeation coefficient, carbon dioxide gas permeation coefficient and water vapor permeation coefficient were determined and calculated according to the following methods.

(i) Solvent Resistance:

A square test piece having a size of 2 cm×2 cm was cut out from the barrel portion of the vessel to be tested, and the test piece was immersed in benzene for 30 minutes, 1 hour or 24 hours. The solvent resistance was evaluated by the observation with the naked eye according to the following rating.

X: whitening and peeling were caused

Δ: peeling was caused though whitening was not caused

O: whitening or peeling was not caused (ii) Chemical Resistance:

A test piece was prepared as described in (i) above, and the test piece was immersed in an aqueous solution containing 10% by weight of caustic soda for 5 minutes, 10 minutes, 1 hour or 24 hours. The chemical resistance was evaluated by the naked eye observation according to the following rating.

X: browning and peeling were caused

Δ: browning was caused through peeling was not caused

O: browning or peeling was not caused.

(iii) Hot Water Resistance:

A test piece was prepared as described in (i) above, and the test piece was boiled for 30 minutes in a thermostat hot water tank maintained at 95° C. The test piece was taken out from the tank and the whitening degree of the test piece was judged by two experts based on the naked eye observation.

O: the two experts judged that no whitening was caused

Δ: one expert judged that no whitening was caused but the other expert judged that whitening was caused X: the two experts judged that whitening was caused (iv) Low-Temperature Burst Characteristic:

The vessel to be tested was filled with an aqueous solution containing 10% by weight of sodium chloride, which was maintained at $-5°$ C. After it was confirmed that the vessel was cooled to $-5°$ C., the above aqueous solution was further supplied into the vessel at a compression rate of 15 Kg/mm to burst the vessel. The burst vessel was observed and evaluation was conducted according to the following rating.

O: peeling or whitening was not caused

Δ: peeling was not caused but whitening was caused

X: peeling was caused (v) Oxygen Permeability ($QO_2$ at 20° C. and 0% RH):

A sheet having a predetermined size was cut out from the barrel portion of the vessel to be tested, and was attached to a gas permeation tester (supplied by Toyo Tester Kogyo K.K.). The sample was secured between two chambers, and the pressure was reduced below $10^{-2}$ mmHg in one chamber (low pressure side) and the atmosphere of the other chamber (high pressure side) was substituted with oxygen dehumidified with calcium chloride so that the pressure in the chamber was 1 atmosphere. The increase of the pressure on the low pressure side was read by a recorder and the oxygen gas permeability was measured.

The measurement was carried out at 20° C., and the relative humidity was reduced to 0% by calcium chloride on the high pressure side.

(vi) Carbon Dioxide Gas Permeability ($QCO_2$ at 20° C. and 0% RH):

The measurement was carried out in the same manner as described in (v) above by using carbon dioxide gas instead of oxygen.

(vii) Water Vapor Permeability ($QH_2O$):

The water vapor permeability $QH_2O$ was carried out according to the method of JIS Z-0208 (Temperature: 40° C., relative humidity: 0 to 90%). A sheet having a predetermined size was cut out from the barrel portion of the vessel and was subjected to the measurement.

(viii) Calculation of Oxygen Gas Permeation Coefficient $PO_2$, Carbon Dioxide Gas Permeation Coefficient $PCO_2$ and Water Vapor Permeation Coefficient $PH_2O$ of Vinylidene Chloride Copolymer Resin:

Since the values of $QO_2$, $QCO_2$ and $QH_2O$ determined according to the above-mentioned methods were those of the composite system of the vinylidene chloride copolymer resin and the vessel substrate, the oxygen permeation coefficient $PO_2$, carbon dioxide permeation coefficient $PCO_2$ and water vapor permeation coefficient $PH_2O$ of the vinylidene chloride copolymer resin coating at the above-mentioned temperature and relative humidity were calculated according to the following equations:

$$PO_2 = \frac{(1.52 \times 10^{-15}) \times h}{\left(\frac{1}{(QO_2)} - \frac{1}{(QO_2)B}\right)}$$

[cc · cm/cm² · sec · cmHg], $$PCO_2 = \frac{(1.52 \times 10^{-15}) \times h}{\left(\frac{1}{(QCO_2)} - \frac{1}{(QCO_2)B}\right)}$$

[cc · cm/cm² · ec · cmHg]

and $$PH_2O = \frac{(1 \times 10^{-4}) \times h}{\left(\frac{1}{(QH_2O)} - \frac{1}{(QH_2O)B}\right)}$$

[g · cm/m² · day]

wherein h stands for the thickness ($\mu$) of the vinylidene chloride copolymer resin, ($QO_2$) stands for the oxygen permeability [cc/m²·day·atm] of the composite system of the vessel substrate and coating layer, ($QO_2$)B stands for the oxygen permeability [cc/m²·day·atm] of the vessel substrate, ($QCO_2$) stands for the sum [cc/m²·day·atm] of the carbon dioxide gas permeability of the vessel substrate and the carbon dioxide gas permeability of the coating layer, ($QCO_2$)B stands for the carbon dioxide gas permeability of the vessel substrate, ($QH_2O$) stands for the sum [g/m²·day] of the water vapor permeability of the vessel substrate and the water vapor permeability of the coating layer, and ($QH_2O$)B stands for the water vapor permeability of the vessel substrate.

EXAMPLE 1

A polyvinylidene chloride type resin latex (dispersion medium: water, solid concentration: 47% by weight, Tg: 17° C., Tm: 148° C.) comprising 100 parts by weight of 83% by weight of vinylidene chloride, 14% by weight of methoxyethylmethyl acrylate and 3% by weight of methyl acrylate and 40 parts by weight of trichloroethylene was coated on an undrawn polyethylene terephthalate sheet having a thickness of 50$\mu$ by a known bar coating method, and the coating was dried by heating at 115° C. for 1 minute. The sheet was heat-sealed to form a pouch A. An uncoated and undrawn polyethylene terephthalate sheet having a thickness of 50$\mu$ was heat-sealed to form a pouch.

The above-mentioned coated sheet was heat-treated at 50° C. for 24 hours and was similarly heat-sealed to obtain a pouch B. An uncoated pouch was similarly formed.

The above-mentioned coated sheet was monoaxially drawn at a draw ratio of 3 in an atmosphere maintained at 35°, 70° or 110° C. and was similarly heat-sealed to obtain a pouch C1, C2 or C3. A corresponding uncoated pouch was similarly formed.

With respect to each of the so-obtained 10 pouches, the organic solvent resistance, chemical resistance (alkali resistance), hot water resistance, low-temperature (−5° C.) burst characteristic, oxygen permeability, carbon dioxide gas permeability and water vapor permeability were determined according to the methods described hereinbefore. Each of the uncoated pouches was used for the measurement of the gas permeation coefficient so as to calculate the gas permeation coefficient of the coating layer. The obtained results are shown in Table 1.

From the results shown in Table 1, it will readily be understood that each of the organic solvent resistance, chemical resistance, hot water resistance, low-temperature burst characteristic and gas barrier properties can be improved by orienting the coating layer. It will also be seen that the carbon dioxide gas barrier property is especially improved among gas barrier characteristics to various gases.

TABLE 1

| | Pouch | | | | |
|---|---|---|---|---|---|
| 1 + m | A<br>0.01 | B<br>0.02 | C1<br>0.47 | C2<br>0.44 | C3<br>0.41 |
| Organic Solvent Resistance | | | | | |
| 30 minutes | X | | | | |
| 1 hour | X | Δ | | | |
| 24 hours | X | Δ | | | |
| Chemical Resistance | | | | | |
| 5 minutes | X | Δ | | | |
| 10 minutes | X | Δ | | | |
| 1 hour | X | X | | | |
| 24 hours | X | X | Δ | Δ | Δ |
| Hot Water Resistance | X | Δ | | | |
| Low-Temperature Burst Characteristic | X | Δ | | | |
| Gas Permeation Coefficients of Coating Layer | | | | | |
| PO₂ | 6.3 × 10⁻¹⁴ | 1.5 × 10⁻¹⁴ | 1.1 × 10⁻¹⁴ | 1.2 × 10⁻¹⁴ | 1.2 × 10⁻¹⁴ |
| PCO₂ | 25.0 × 10⁻¹⁴ | 5.1 × 10⁻¹⁴ | 2.7 × 10⁻¹⁴ | 2.8 × 10⁻¹⁴ | 2.8 × 10⁻¹⁴ |
| PH₂O | 6.0 × 10⁻³ | 1.0 × 10⁻³ | 0.7 × 10⁻³ | 0.7 × 10⁻³ | 0.7 × 10⁻³ |

EXAMPLE 2

An anchoring agent (EL-220/EL-200-AD supplied by Toyo Morton K.K.) was coated on the surface of an isotactic polypropylene sheet having a width of 30 cm and a thickness of 0.8 mm and the coated sheet was heat-treated at 100° C. for 30 seconds. A vinylidene chloride copolymer latex (dispersion medium: water, emulsifier: sodium lignosulfonate, solid concentration: 61%, Tg: 0° C., Tm: 150° C.) comprising 86% by weight of vinylidene chloride, 8% by weight of methyl acrylate and 6% by weight of glycidyl acrylate was spray-coated on the precoated surface of the sheet, and the coated sheet was dried at 110° C. for 30 seconds in an air-circulating oven. Then, the sheet was subjected to plug-assist air-pressure forming at 140° or 155° C. to obtain a square-shaped cup (square-shaped wide-mouthed vessel) having a length of 9.5 cm in the longitudinal direction, a length of 9.5 cm in the lateral direction, a height of 3.4 cm and an average thickness of 0.45 mm. The cup formed at 140° C., that is, a temperature a lower than the melting point of the above-mentioned vinylidene chloride copolymer, was designated as "cup D1", and the cup formed at 155° C., that is, a temperature higher than the melting point of the above-mentioned vinylidene chloride copolymer, was designated as "cup D2".

With respect to each cup, the organic solvent resistance, chemical resistance (alkali resistance), hot water resistance, low-temperature ($-5°$ C.) burst characteristic, oxygen permeability, carbon dioxide gas permeability and water vapor permeability were determined according to the methods described hereinbefore.

Incidentally, in order to calculate the gas permeation coefficient of the coating layer, an uncoated cup was similarly prepared and was used for measurement of the gas permeation coefficient.

The obtained results are shown in Table 2.

From the results shown in Table 2, it will readily be understood that when the coating layer is oriented, the solvent organic solvent resistance, chemical resistance, hot water resistance, low-temperature burst characteristic and gas barrier properties are improved over those obtained when the coating layer is melted. When the forming operation is carried out at a temperature higher than the melting point of the coating layer, light yellowing is caused, and it is construed that certain deterioration takes place in this case.

TABLE 2

|  | Cup | |
|---|---|---|
| $1 + m$ | D1<br>0.40 | D2<br>0.02 |
| Organic Solvent Resistance | | |
| 30 minutes |  | Δ |
| 1 hour |  | X |
| 24 hours |  | X |
| Chemical Resistance | | |
| 5 minutes |  | Δ |
| 10 minutes |  | Δ |
| 1 hour |  | X |
| 24 hours |  | X |
| Hot Water Resistance |  | Δ |
| Low-Temperature Burst Characteristic |  | X |
| Gas Permeation Coefficients of Coating Layer | | |
| $PO_2$ | $1.3 \times 10^{-14}$ | $2.1 \times 10^{-14}$ |
| $PCO_2$ | $2.5 \times 10^{-14}$ | $4.8 \times 10^{-14}$ |

TABLE 2-continued

|  | Cup | |
|---|---|---|
| $1 + m$ | D1<br>0.40 | D2<br>0.02 |
| $PH_2O$ | $0.8 \times 10^{-3}$ | $1.0 \times 10^{-3}$ |

EXAMPLE 3

The inner or outer surface of a perform (bottomed parison) having an outer surface area of 130 cm², a weight of 62.5 g of an average thickness of 3.60 mm and being composed of amorphous polyethylene terephthalate was dip-coated with the vinylidene chloride copolymer latex described in Example 1 in an amount as solids of 0.18 g or 0.22 g, and the coated preform was dried at 70° C. for 2 minutes. By using a known biaxial draw-blow-molding machine, the preform was heated for 20 seconds so that the maximum outer surface temperature was 130° C. and the outer surface temperature at the blowing step was 117° C., and the preform was biaxially draw-blow-molded to obtain a biaxially drawn polyethylene terephthalate bottle having an inner capacity of 2000 cc and having the inner or outer surface coated with the vinylidene chloride copolymer. The bottle having the inner surface coated was designated as "bottle E1", and the bottle having the outer surface coated was designated as "bottle E2".

An uncoated polyethylene terephthalate bottle was obtained by subjecting an uncoated preform as described above to biaxial draw-blow-molding under the same conditions as described above, and the inner or outer surface of the bottle was dip-coated with the above-mentioned vinylidene chloride copolymer latex in an amount of 1.18 g or 1.21 g. The coated bottle was dried at 70° C. for 2 minutes. The bottle having the inner surface coated was designated as "bottle F1", and the bottle having the outer surface coated was designated as "bottle F2".

With respect to each bottle, the organic solvent resistance, chemical resistance (alkali resistance), hot water resistance, low-temperature ($-5°$ C.) burst characteristic, oxygen permeability, carbon dioxide gas permeability and water vapor permeability were determined according to the methods described hereinbefore.

Incidentally, in order to calculate the gas permeability coefficient of the coating layer, the uncoated bottle was used for the measurement of the gas permeation coefficient.

The obtained results are shown in Table 3.

TABLE 3

|  | Bottle | | | |
|---|---|---|---|---|
| $1 + m$ | E1 | E2 | F1 | F2 |
| Organic Solvent Resistance | | | | |
| 30 minutes |  |  | X | X |
| 1 hour |  |  | X | X |
| 24 hours |  |  | X | X |
| Chemical Resistance | | | | |
| 5 minutes |  |  | Δ | X |
| 10 minutes |  |  | X | X |
| 1 hour |  |  | X | X |
| 24 hours |  |  | X | X |
| Hot Water Resistance |  |  | X | X |
| Low-Temperature Burst Characteristic |  |  | X | X |
| Gas Permeation Coefficients of Coating Layer | | | | |
| $PO_2$ | $1.0 \times 10^{-14}$ | $1.2 \times 10^{-14}$ | $5.2 \times 10^{-14}$ | $5.3 \times 10^{-14}$ |
| $PCO_2$ | $2.5 \times 10^{-14}$ | $2.8 \times 10^{-14}$ | $21.0 \times 10^{-14}$ | $21.3 \times 10^{-14}$ |

TABLE 3-continued

| 1 + m | Bottle | | | |
|---|---|---|---|---|
| | E1 | E2 | F1 | F2 |
| PH$_2$O | $0.6 \times 10^{-3}$ | $0.8 \times 10^{-3}$ | $5.7 \times 10^{-3}$ | $5.8 \times 10^{-3}$ |

From the results shown in Table 3, it will readily be understood that when the coating layer is oriented, the organic solvent resistance, chemical resistance, hot water resistance, low-temperature burst characteristic and gas barrier properties are improved. The gas barrier properties obtained when the inner surface of the preform is coated is slightly superior to the gas barrier properties obtained when the outer surface of the preform is coated. The reason is believed to be that since the temperature at which the inner surface portion is drawn is lower than the temperature at which the outer surface portion is drawn, the heat history of the coating layer on the inner surface is reduced and deterioration is not caused. From the results of the measurement of the surface temperatures, it is expected that the temperature of the coating layer is lower by at least 10° C. than the temperature of the resin substrate. It is construed that the reason why reduction of the properties of the coating layer on the outer surface is not significant is that since the temperature of the outer surface portion is rapidly lowered (it is expected that this temperature is reduced below the temperature of the resin substrate), deterioration is not caused.

What is claimed is:

1. A process for the preparation of coated oriented plastic vessels, which comprises coating an aqueous latex of a vinylidene chloride copolymer on at least one surface of a bottomed parison composed of amorphous polyethylene terephthalate, drying the coated latex to form a coated structure provided with an outermost surface coating layer on a polyethylene terephthalate substrate and subjecting the coated structure to biaxial draw-blow-molding at a temperature higher than the glass transition temperature of the vinylidene chloride copolymer but lower than the melting point of the vinylidene chloride copolymer under such a condition that the temperature of the coating layer of the coated structure is lower by at least 5° C. than the average temperature of the polyethylene terephthalate substrate, at a draw ratio in the axial direction of 1.10 to 20 and at a draw ratio in the circumferential direction of 1.20 to 50, at which temperature draw-molding of said parison is possible, to thereby form the coated structure into a shape of a vessel while drawing the coating layer so that the coating layer of the vinylidene chloride copolymer has such a molecular orientation that the sum of two-dimensional orientation coefficients (l+m) in the axial direction and circumferential direction is at least 0.4 as measured according to the polarized light fluorometry and the coating layer is not substantially peeled at the low-temperature burst test conducted at −5° C.

2. The process of claim 1 wherein the aqueous latex has a solid concentration of 20 to 65% and a viscosity of 3 to 500 cps.

3. The process of claim 1 wherein the draw ratio in the axial direction is 1.20 to 15, and the draw ratio in the circumferential direction is 1.25 to 30.

4. The process of claim 1 wherein the vinylidene chloride copolymer has a glass transition temperature of not more than 25° C.

* * * * *